[19] United States Patent
Besik

[11] 3,980,556
[45] Sept. 14, 1976

[54] ADSORPTION BIOOXIDATION TREATMENT OF WASTE WATERS TO REMOVE CONTAMINANTS THEREFROM

[75] Inventor: Ferdinand Besik, Mississauga, Canada

[73] Assignee: Ontario Research Foundation, Sheridan Park, Canada

[22] Filed: Jan. 13, 1975

[21] Appl. No.: 540,513

Related U.S. Application Data

[63] Continuation-in-part of Ser. No. 436,480, Jan. 25, 1974, abandoned.

[52] U.S. Cl. .............................. 210/6; 210/7; 210/16; 210/17; 210/40; 210/DIG. 28
[51] Int. Cl.² .............................................. C02C 1/04
[58] Field of Search .............. 210/150, 151, 17, 15, 210/16, 11, 14, 2, 3, 4–8, 18, 261, 268, 39, 40, 30, DIG. 28

[56] References Cited
UNITED STATES PATENTS

| | | | |
|---|---|---|---|
| 1,734,011 | 10/1929 | Harrison | 210/15 |
| 2,562,510 | 7/1951 | Schlenz | 210/5 |
| 3,557,954 | 1/1971 | Welch | 210/17 |
| 3,563,888 | 2/1971 | Klock | 210/150 |
| 3,654,147 | 4/1972 | Levin et al. | 210/16 |
| 3,803,029 | 4/1974 | Blecharczyk | 210/17 |
| 3,846,289 | 11/1974 | Jeris et al. | 210/11 |
| 3,853,752 | 12/1974 | Tymoszczuk | 210/150 |

*Primary Examiner*—Charles N. Hart
*Assistant Examiner*—Benoit Castel
*Attorney, Agent, or Firm*—Sim & McBurney

[57] ABSTRACT

Suspended and dissolved biodegradable carbonaceous materials and nitrogenous materials present as contaminants in waste water, typically in raw domestic or municipal sewage, are substantially removed by a one-stage treatment. The waste water is contacted with a mixture of activated carbon and microorganisms, known herein as activated sludge, having molecular oxygen absorbed therein, which results in adsorption and biooxidation of the carbonaceous material, biooxidation of non-nitrate nitrogenous material to nitrate and depletion of the molecular oxygen whereupon biological reduction of the nitrate to nitrogen gases occurs. The nitrogen gases are vented and the resulting treated water is separated from the activated sludge. Regeneration of the activated sludge may be achieved by air stripping, after which the regenerated activated sludge material may be recycled. Further, the treated water may be subjected to clarification to complete the biological reactions and to remove residual suspended solids. The activated sludge from the clarification may be regenerated by air stripping followed by recycle of the regenerated material to the reactor.

11 Claims, 4 Drawing Figures

ADSORPTION BIOOXIDATION TREATMENT OF WASTE WATERS TO REMOVE CONTAMINANTS THEREFROM

REFERENCE TO RELATED APPLICATION

This application is a continuation-in-part of application Ser. No. 436,480 filed Jan. 25, 1974 now abandoned.

FIELD OF INVENTION

The present invention relates to the treatment of waste water.

BACKGROUND TO THE INVENTION

Waste waters, typically domestic and municipal sewage, contain a variety of contaminants, typically biodegradable suspended, colloidal and dissolved carbonaceous materials, various nitrogenous compounds, including organic nitrogen compounds, ammonia and nitrates, and phosphate materials.

It is relatively simple to remove carbonaceous and phosphate materials from waste water, but rather difficult to remove nitrogenous materials. It is known that it is possible to remove nitrogenous materials biologically or by physical-chemical processes.

One prior art procedure which has been suggested for the biological removal of nitrogenous materials is a three-stage biological system which includes ammonification and nitrification of the nitrogenous materials under aerobic conditions followed by denitrification under anaerobic conditions. The denitrification procedure involves the addition of energy in a chemical form, typically as methanol. This prior art procedure is described by Barth et al in JWPCF vol. 40, No. 12, p.2040 (1968). In this prior art proposal, the treatment process consists of three separate biological sludge systems. Each system has its own recycle and is distinct from the others. The waste water flows through these systems in series, with intermediate settling between the systems. In this way, the biological activities of carbon oxidation to remove carbonaceous materials, ammonification and nitrification and denitrification to remove nitrogenous materials are isolated from each other and occur in three separate stages.

This procedure is successful in the removal of the contaminants, but suffers from several drawbacks. The procedure is time-consuming, results in high net sludge production, has three separate stages of aeration and clarification, and involves considerable control and operating expenditures.

SUMMARY OF INVENTION

In accordance with the present invention, waste water containing biodegradable carbonaceous materials in solid, colloidal or dissolved form and nitrogenous materials in organic nitrogen, ammonia, nitrite and nitrate form as contaminants is subjected to a one-stage adsorption-biological oxidation process for the substantial removal of these contaminants from the waste water.

DESCRIPTION OF PREFERRED EMBODIMENTS

Figure 1:
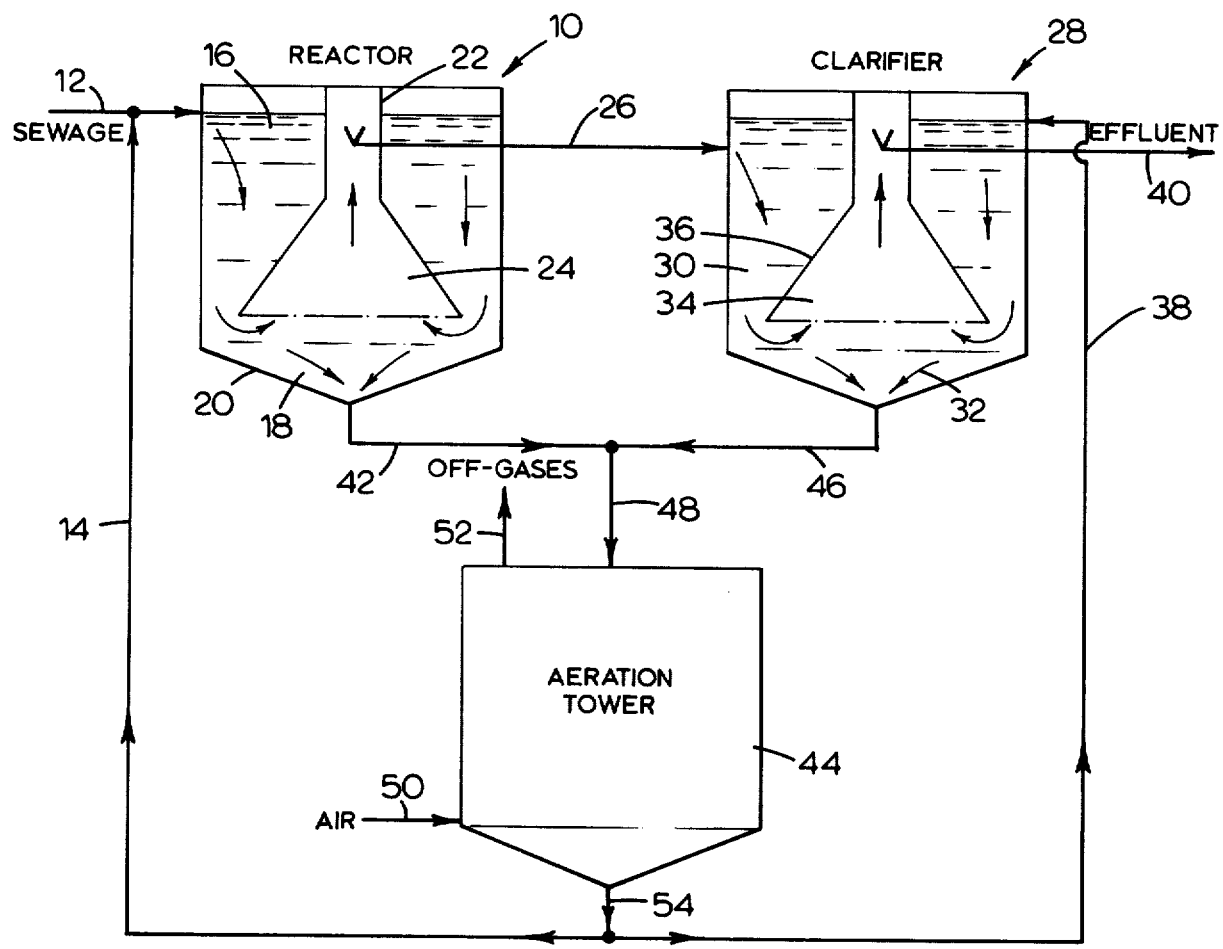
FIG. 1 is a schematic flow sheet illustrating one embodiment of the invention.

Referring first to the embodiment of FIG. 1, sewage, or other contaminated waste water, which may be domestic, municipal or industrial sewage, after removal of gross solids by screening or in a primary clarifier is fed to the top of the reactor 10 by line 12. A recycled mixture of powdered activated carbon and microorganisms, known hereinafter as "activated sludge", in line 14, also is fed to the top of the reactor 10 along with the sewage in line 12. The recycled mixture in line 14 is formed as described in more detail below and contains quantities of absorbed oxygen.

The reactor 10, generally of cylindrical shape, includes a first chamber 16 in which the mixture of sewage and activated sludge flows downwardly towards a second chamber 18 located in a lower end closure portion 20 of the reactor 10. The end closure portion 20 generally is of conical shape.

An inverted funnel-shaped member 22 is positioned in the reactor 10 defining a third chamber 24 which is out of fluid flow communication with the first chamber 16, other than through the second chamber 18.

In the first chamber 16, the suspended, colloidal and dissolved organic materials contained in the sewage are adsorbed onto the activated carbon and/or absorbed into the microbial cells, any residual organic materials being removed at a later stage. The adsorbed organic material is biologically oxidized by the microorganisms, while organic nitrogen is converted to ammoniacal nitrogen and ammoniacal nitrogen is biologically oxidized by the microorganisms to nitrites and nitrates.

The biological oxidations occuring in the first chamber 16 deplete the absorbed oxygen to a level at which the heterotropic microorganisms in the activated sludge cause anaerobic conversion of nitrite and nitrate to nitrogenous gases, mainly nitrogen and nitrogen dioxide, as the microorganisms utilize the oxygen values of the nitrite and nitrate. The biological reactions occur simultaneously in the first chamber 16.

The resulting mixture of activated sludge, processed waste water and gaseous substances passes from the first chamber 16 to the second chamber 18.

Part of the sludge separates from processed waste water in the second chamber 18. The processed waste water, some sludge and the gaseous substances, consisting mainly of nitrogen, nitrogen dioxide and carbon dioxide, pass upwardly from the second chamber 18 to the third chamber 24 within the inverted funnel 22.

The liquid effluent from the reactor 10 is removed by line 26 leading from the throat section of the inverted funnel 22. The gases separated in the second chamber 18 are vented to atmosphere through the throat of the inverted funnel 22. The effluent in line 26 has a substantially decreased content of organic substances and nitrogenous materials as compared with the sewage fed by line 12. The reactor 10, therefore, in a single vessel has removed from the processed waste water substantial quantities of the carbonaceous materials and has converted substantial quantities of the nitrogenous material to nitrogenous gases.

The reactor 10, therefore, performs a number of functions on the contaminants of the waste water.

Among these functions are those of subdivision of suspended solids by hydrolysis, separation of dissolved organic matter by adsorption on activated carbon and microbial cells, biological oxidation of adsorbed organic matter, biological conversion of organic nitrogen to ammoniacal nitrogen, conversion of ammoniacal nitrogen to nitrites and nitrates and conversion of nitrites and nitrates to nitrogenous gases.

The effluent in line 26 is passed to a clarifier 28, possessing a first chamber 30, a second chamber 32 and a third chamber 34, the latter chamber being maintained out of fluid flow communication with the first chamber 30 other than through the second chamber 32 by an inverted funnel 36.

The effluent in line 26 fed to the first chamber 30 of the clarifier 28 is contacted by recycled activated sludge fed thereto by line 38. This recycled mixture is formed as described in more detail below.

The coagulation and sedimentation of suspended solids from the reactor effluent is improved by addition of the reactivated sludge into the first chamber 30 of the clarifier 28 by line 38. A substantial proportion of the remaining quantities of carbonaceous materials and nitrogenous materials present in the effluent are biologically consumed, thereby further purifying the treated waste water. Since the concentrations of carbonaceous and nitrogenous materials in the reactor effluent in line 26 are very low, the dissolved oxygen in the return sludge in line 38 is not depleted and aerobic conditions exist throughout the clarifier 28, in contrast to the presence of both aerobic and anaerobic conditions in the reactor 10.

In the second chamber 32 of the clarifier 28, the sludge is separated substantially from the liquid phase which exists from the third chamber 34 of the clarifier 28 by line 40 from the throat of the inverted funnel 36. The effluent is substantially free from suspended solids, carbonaceous materials and nitrogenous materials.

The clarifier 28, therefore, performs a number of functions on the contaminants of the waste water remaining in the effluent from the reactor 10 in line 26. These functions include completion of the biological reactions on the carbonaceous and nitrogenous materials, and biological flocculation, sludge coagulation and sedimentation of suspended solids.

The water in line 40, however, may be subjected to further treatment, such as deep bed multimedia filtration with sand, anthracite and activated carbon to decrease further the suspended solids content and/or chemical treatment to decrease its phosphate content. The effluent in line 40 may be treated to provide water of potable quality by various procedures, including coagulation and filtration followed by disinfection; and/or reverse osmosis followed by disinfection; or evaporation followed by disinfection; or ion-exchange followed by disinfection.

The sludge which is separated in the second chamber 18 of the reactor 10 is removed therefrom by line 42 and is passed to an aeration tower 44. The sludge which is separated in the second chamber 32 of the clarifier 28 is passed by line 46 to the aeration tower 44, forming with the sludge in line 42 a composite sludge feed in line 48.

The aeration tower 44 may be of any convenient construction to allow intimate contact between gas and sludge, typically a multistage countercurrent contact column or a cross-flow reactor.

Air, or other gas rich in or consisting of molecular oxygen, is fed by line 50 to the aeration tower 44 wherein it contacts the sludge fed by line 48, causing stripping of volatiles from the sludge, saturation of the sludge with oxygen, reactivation of the carbon by oxidation of the carbonaceous and nitrogenous materials absorbed thereon, and oxidation of a portion of the microbial cells, thereby maintaining a balance of microorganisms in the system. The spent gases are vented from the aeration tower 44 through line 52.

The reactivated sludge is withdrawn from the aeration tower 44 by line 54 and is divided into two streams, one passing by line 14 to the reactor 10 and the other passing by line 38 to the clarifier 28.

In a modification of the embodiment of FIG. 1, feed of activated sludge by line 38 may be omitted. In this modification, some air may be added to the effluent in line 26 for the completion of the biological reactions in the clarifier 28. Alternatively, the addition of air to the effluent in line 26 may be omitted.

In a further modification of this embodiment of the invention, the sewage is fed to line 48 rather than directly to the reactor 10 by line 12.

Figure 2:
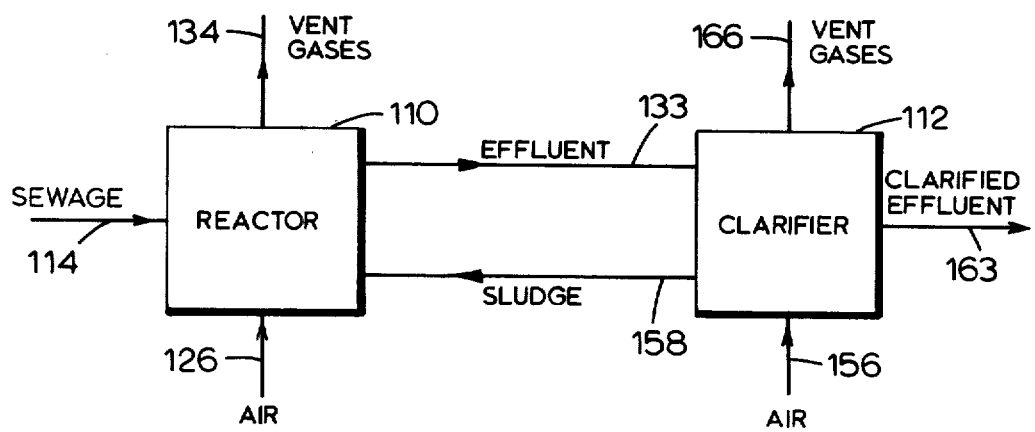
FIG. 2 is a schematic flow sheet illustrating a second embodiment of the invention.
Figure 4:
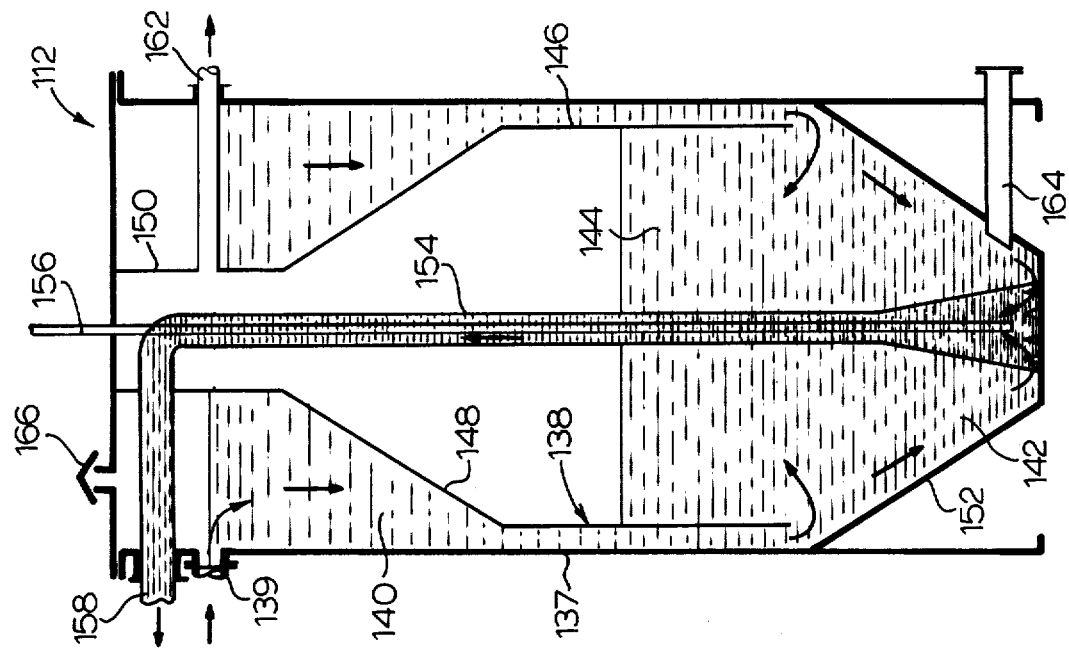
FIG. 4 is a part-sectional view of a clarifier for use in the embodiment of the invention illustrated in FIG. 2.
Figure 3:
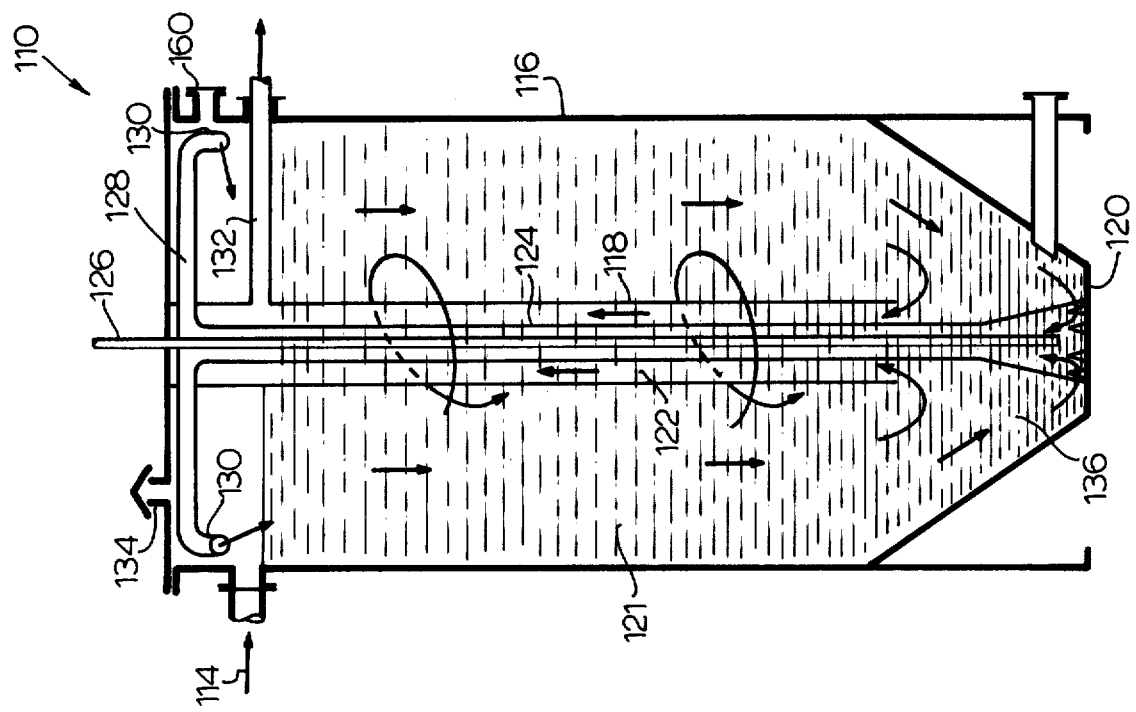
FIG. 3 is a part-sectional view of a reactor for use in the embodiment of the invention illustrated in FIG. 2.

Turning now the embodiment of FIGS. 2 to 4, a waste water treatment system includes a reactor 110 shown schematically in FIG. 2 and in more detail in FIG. 3 and a clarifier 112 shown schematically in FIG. 2 and in more detail in FIG. 4. Screened or primary clarified sewage is fed by line 114 to the reactor 110. Such sewage typically contains suspended solids, dissolved organic materials, organic nitrogen, nitrate, nitrite and ammonia values. The reactor 110 consists of an upright cylindrical outer container 116 and a cylindrical inner sleeve 118 located coaxially with the container 116 and spaced upwardly from the base 120 thereof to define a first chamber 121 between the outer container 116 and the inner sleeve 118. The inner sleeve 118 extends upwardly to a point located above the intended liquid level in the reactor 110.

A hollow riser-aerator tube 124 is positioned in the reactor 110 extending from the base 120 and upwardly through the second chamber 122 and beyond the upper extremity of the sleeve 118 and terminating exteriorally of the reactor 110.

The tube 124 is flared outwardly at the lower end thereof and is spaced upwardly from the base 120 to allow the passage of fluid into the tube 124. A gaseous material feed tube 126 extends downwardly from the upper extremity of the tube 124 to a position immediately vertically-upwardly displaced from the lower end of the tube 124 to allow the discharge of air, oxygen or a gas rich in molecular oxygen in the tube 124 adjacent its lower end.

The riser tube 124 adjacent its upper extremity but within the reactor 110 communicates with a cross-arm member 128 extending radially of the container 116 which in turn communicates with a tubular discharge member 130 at each radial extremity thereof. The tubular discharge members 130 include a downwardly-extending portion and a horizontally-extending portion positioned above and adjacent the intended liquid level in the container 116 and extending adjacent the inner wall of the container 116 to discharge fluid therefrom substantially tangentially.

While one such riser tube 124 with associated cross arm and discharge members 128 and 130 are illustrated in FIG. 3, any other desired number may be employed, depending on the requirements of the system.

A liquid effluent tube 132 is provided in communication with the second chamber 122 but out of communication with the first chamber 121 for removal of treated liquid from the reactor 110 through the second chamber 122.

A gaseous discharge vent 134 is provided at the upper end of the reactor 110 above the intended liquid level in the reactor 110 for discharge of gases formed in the reactions in the reactor 110.

An inlet opening 160 also is provided in the reactor 110 above the intended liquid level in the container 116 for feed of recycled activated sludge from the clarifier 112, as described in more detail below.

Sewage fed to the reactor 110 by line 114 mixes with mixed liquor suspended solids-activated sludge, discharged from the discharge members 130 and activated sludge recycled from the clarifier 112 and rotates in the first reaction chamber 121. By centrifugal action, the activated sludge particles together with suspended solids tend to partially separate and accumulate along the inner wall of the container 116 and also move downwardly under the influence of gravity and the downflow velocity of the liquid phase to accumulate in a third chamber 136 adjacent the base 120.

Adjacent the base 120 of the container 116, liquor is drawn into the riser tube 124 under the influence of the air rising in the tube 124 as a result of the discharge of the same from the tube 126 and is discharged at the discharge members 130 to mix with further incoming sewage. The liquor rising in the tubes 124 is a slurry of part of the accumulated activated sludge and processed sewage.

Processed liquor, together with some activated sludge, also passes out of the first chamber 121 into the second chamber 122, rises therein and passes out of the reactor 110 through tube 132.

The partial separation and accumulation of the solids along the inner wall of the container 116 under the centrifugal action of the rotating liquid decreases the tendency thereof to enter the second chamber 122 and hence decreases the tendency thereof to be discharged from the reactor 110 with the effluent in tube 132, thereby decreasing the quantity of solids requiring separation by later clarification and decreasing the amount of sludge to be recycled from the clarifier 112 to the reactor 110. The partial separation and accumulation of solids also increases the retention time of the suspended solids in the reactor 110.

The result of the rotation of the suspended solids is a plug flow pattern for the reactor liquor, oriented downwardly along the vertical axis of the reactor 110 and through the first chamber 121. As the liquor and solids flow downwardly in the first chamber 121, substantially all the suspended, colloidal and dissolved organic materials contained in the sewage are adsorbed by the activated sludge. The adsorbed organic material is biologically oxidized by the microorganisms, while organic nitrogen is converted to ammoniacal nitrogen and ammoniacal nitrogen is biologically oxidized by the microorganisms to nitrites and nitrates.

The biological oxidations deplete the absorbed oxygen to a level at which the heterotropic microorganisms in the activated sludge cause endogenous respiration and anaerobic conversion of nitrite and nitrate to nitrogenous gases, the adsorbed organic carbon increasing the rate of denitrification.

The dissolved oxygen concentration gradient is affected by the biological reactions and the downward velocity of the liquor through the first chamber 121, the latter being regulated by the volume of air introduced by the gas feed tube 126 to the riser tube 124.

The biological reactions and adsorption in the chamber 121 also decrease the phosphate content of the sewage to a significant degree.

Since the sludge entering the riser tube 124 has a very low dissolved oxygen content, there is a considerable driving force for oxygen transfer at this point, resulting in rapid and efficient absorption of oxygen by the biomass and saturation of the mixed liquor-sludge with oxygen prior to discharge from the elements 130. The riser tube 124 therefore may be regarded as a "flash aerator".

The velocity of the air-lifted sludge in the riser tubes 124 results in numerous collisons of solid particles, resulting in their abrasion and a higher rate of hydrolysis of recycled suspended solids. This effect may be enhanced by the addition of granular abrasive solids, such as granular activated carbon to the reactor liquor.

The reactor 110 in this embodiment, therefore, replaces the reactor 10 and the aeration tower 44 utilized in the embodiment of FIG. 1, simplifying considerably the equipment and hydraulic requirements of the system. The reactor 110, therefore, achieves the following functions within a single, compact unit: subdivision of suspended solids by abrasion in the flash aeration riser tube 124, hydrolysis of suspended solids, separation of dissolved organic matter from the waste water by adsorption on activated carbon and microbial cells, biological oxidation of adsorbed organic matter, biological conversion of organic nitrogen to ammoniacal nitrogen (for ammonification), biological oxidation of ammoniacal nitrogen to nitrite and/or nitrate nitrogen (or nitrification), biological reduction of nitrite and nitrate nitrogen to nitrogenous gases (or denitrification), biological reactivation of activated carbon, oxygenation of settled microbial cells and activated carbon and stripping of volatiles.

The design of the reactor 110 shown in FIG. 3 allows a number of beneficial effects, including efficient utilization of oxygen from air, efficient mixing of activated sludge, high concentration of sludge for bio-reactions, optimum concentration gradient of dissolved oxygen to accommodate organic matter biooxidation, ammonification, nitrification and denitrification in one reactor, mechanical grinding of suspended solids by high velocity of sludge in flash aerators, utilization of surface media to increase rate of reaction and elimination of air pollution.

The effluent from the reactor 110 containing some entrained activated sludge and suspended solids in tube 132 is passed by line 133 to the clarifier 112. The liquor in line 133 is fed into the clarifier 112 substantially tangentially of the inner wall of a container 137 by pipe 139 at the intended liquid level in the container 137.

An inverted funnel-like member 138 is located within the container 137 and defines therewith a first chamber 140 between the funnel-like member 138 and the container 137 a sludge accumulation chamber 142 and a settling chamber 144 inside the funnel-like member 138.

The funnel-like member 138 includes a skirt portion 146 concentric with and spaced inwardly from the inner wall of the container 137, a truncated cone portion 148 and a throat portion 150 also concentric with the container 137 and extending upwardly above the intended liquid level in the container 137.

The sludge accumulation chamber 142 also is defined by a conical insert 152 engaging the inner side and base of the container 137 whereby the sludge accumulation chamber has a decreasing diameter towards the base of the container 137. A hollow riser tube 154 is positioned concentrically of the container 137 and extends through the chamber 144 and into the sludge accumulation chamber 142 to a location spaced immediately upwardly of the base of the container 137, the riser tube 154 flaring outwardly at its lower end.

A gas feed tube 156 is situated within the riser tube 154 to feed air, oxygen or other gas rich in molecular oxygen into the riser tube 154 adjacent the lower end of the riser tube 154 to lift sludge out of the accumulation chamber 142 and aerate the same during the lifting, prior to discharge from the clarifier 112 for recycle to the reactor 110 by line 158.

The feed of the liquor by line 133 and discharge pipe 139 to form a rotating liquid body in the chamber 140 results in separation of suspended solids from entrained gas bubbles by the centrifugal forces. The gases may be vented from the clarifier 112 through vent 166.

Suspended solids tend to move radially outwardly to accumulate adjacent the inner wall of the container 137 while the gas bubbles tend to move inwardly and upwardly, producing a thin layer of foam at the surface of the rotating liquor. The foam is consistently broken by the incoming stream, so that it never overflows and hence any potential foaming problem is overcome. The solids move downwardly through the chamber 140 towards the sludge accumulation chamber 142 under the influence of gravity and the velocity of liquid flow through the chamber 140.

The separation of the gas bubbles in the first chamber 140 as foam on the top of the liquor prevents substantially the presence of such bubbles in chambers 142 and 144 where they may disrupt the sedimentation of the sludge.

By providing time for efficient gas separation in the first chamber 140, conditions also arise for completion of the biooxidation reactions and denitrification by the mixed microbial population. Granular or powdered suspended solids, for example, activated carbon, may be used to increase the reaction rates and to increase the density of the sludge to improve the rate and efficiency of suspended solids separation.

The sludge is separated from the processed waste water by sedimentation in chamber 144 with further settling and compression of the sludge in chamber 142.

The clarified effluent leaves the clarifier 112 by pipe 162 communicating with the third chamber 144 but out of communication with the first chamber 140 and by line 163. The clarified effluent in line 163 may be subjected to additional treatment, as described above in connection with the effluent in line 40 in the embodiment of FIG. 1.

A pipe 164 may communicate with the sludge accumulation chamber 142 for removal of excess sludge therefrom, if required.

The clarifier 112 therefore achieves a variety of functions in the purification of the waste water, including completion of the biological reactions, biological flocculation, sludge coagulation and suspended solids separation by settling, and provision of sludge in preaerated form for passage to the reactor 110.

The design of clarifier illustrated in FIG. 4 provides a number of beneficial effects in the treatment of the waste water, including efficient separation of scum and foam, reactor volume for completion of biooxidation reactions and denitrification, gentle mixing of mixed liquor suspended solids to achieve biological flocculation and coagulation compression of settled sludge, reaeration of recycled settled sludge and elimination of the need for a sludge recirculation pump.

The operations of the reactor 110 and the clarifier 112 balance the quantity of sludge present in the system and contain the sludge within the reactor 110 and clarifier 112, sludge being substantially absent from the clarified effluent in line 162.

The process of the invention involves several features which enable three different operations to occur in one reactor, the three operations being biological oxidation of organics and nitrogenous materials, nitrification and denitrification in the reactor. There is an efficient and rapid separation of dissolved organic material from the waste water by adsorption on activated carbon and microbial cells which provides ideal conditions for nitrification and denitrification. The overall retention time is considerably less than in the prior art systems.

Activated carbon provides the adsorption capacity of the system for removal of organics in the initial stages of the operation, provides for even redistribution of carbonaceous materials in periods of high and low BOD loadings due to adsorption and desorption of organics in relation to BOD concentration, as a catalyst supports oxidation reactions, and provides a porous structure supporting microbial growth. The resulting sludge has excellent settling properties permitting efficient separation of suspended solids and a fast build-up of the mixed microbial population responsible for the biological reactions.

The oxygen required for the biooxidation reactions and for the reactivation of activated carbon is provided by aerating the settled sludge. Since the concentration of sludge is generally above 8,000 mg/l., the transfer of oxygen from air to the microbial cells and activated carbon is substantially direct and less through molecular diffusion through water than is the case in other biological processes. Consequently, the oxygen mass transfer rates to microbial cells are higher, the required aeration volume smaller and the oxygen utilization better than in conventional systems.

EXAMPLES

The invention is illustrated further by the following Examples:

EXAMPLE 1

Domestic sewage was treated on a pilot plant scale using an apparatus of the type illustrated in FIG. 1 at a flow rate of about 10,000 gallons per day over a continuous period of 60 days. The apparatus was unattended in this period with the exception of the taking of samples for analysis. The reactor 10 and the clarifier 28 were of the same dimensions having a volume of 118 cubic feet. The aeration tower 44 had a volume of 75 cubic feet and an effective aeration volume of 53 cubic feet.

Domestic sewage, which was prescreened to remove gross solids, was fed at a flow rate varying between 5 and 6 gallons per minute to reactor 10 which contained 125 lbs. of activated carbon. The superficial contact time, calculated as the ratio of volume of reactor to flow rate of sewage, varied between 2.4 and 2.9 hours. Over the test period, the constitution of the treated sewage varied widely.

The liquid effluent from the reactor 10 which was obtained at a rate of 5 to 6 gallons per minute and was tested from time to time for various contaminants, was passed by line 26 to the clarifier 28 containing 125 lbs. of activated carbon, resulting in a superficial contact time for the liquor therein of 2.4 to 2.9 hours. The liquid effluent from the clarifier 28 in line 40 was tested from time to time for the concentration of contaminants therein, and was passed to a deep bed activated carbon filter, the effluent from which was tested for contaminants.

44 wherein it was subjected to countercurrent contact with air, the air consumption being about 30 to 40 SCFM, the sludge concentration being greater than 8,000 mg/l and the superficial contact time of the sludge in the aeration tower 44 being 1.1 to 1.33 hours. During the 60-day run, there was no withdrawal of sludge or addition of activated carbon.

The results obtained over the last 15-day period of the first 30-day pilot plant operation are summarized in the following Table I and results from the 60-day operation are summarized in Table II:

TABLE I

Concentration of Contaminants During Treatment
(Sludge age 16 to 32 days)

| Contaminant | Screened Sewage Range - Av mg/l | Reactor Effluent Range - Av mg/l | Removed Av % | Clarifier Effluent Range - Av mg/l | Removed Av % | Filtered Effluent Range - Av mg/l | Removed Av % |
|---|---|---|---|---|---|---|---|
| TOC | (38–111) - 75.1 | (7–14.8) - 9.8 | 86.9 | (6–10.7) - 8.0 | 89.3 | (2.7–6.8) - 4.7 | 93.7 |
| DOC | (13–41) - 30.3 | (6–9.9) - 7.3 | 75.9 | (5.5–7.4) - 6.5 | 78.5 | (1.6–4.4) - 2.2 | 92.7 |
| BOD | (170–297) - 208 | — | — | — | — | (1.5–2.9) - 2.3 | 98.9 |
| Total N* | (8.9–56.2) - 24.6 | (4.6–15.3) - <6.45 | 73.7 | (2.9–11.6) - <7.5 | 69.5 | (3.3–9.7) - <5.8 | 76.4 |
| Ammonia-N | (8–54.5) - 22.8 | (0.5–8.2) - <3.52 | 84.5 | (0.3–1.9) - <0.8 | 96.4 | (0.4–0.9) - <0.5 | 97.8 |
| Nitrate-N | (0.9–2.6) - 1.84 | (2–8.6) - <2.93 | — | (2.5–11.3) - 6.7 | — | (3–9.4) - <5.3 | — |
| S.S. | (67–195) - 122 | (3.8–17) - 9.13 | 92.5 | (2.6–7) - 5.0 | 95.9 | (0.2–3.0) - <1.2 | 99+ |
| V.S.S. | (46–167) - 104 | (3–12) - 7.0 | 93.2 | (2.2–6) - 4.2 | 95.9 | (0.2–1.6) - <0.6 | 99.4 |
| Turbidity | (45–125) - 76.7 | (2.3–4.7) - 2.9 | 96.2 | (1.8–4.2) - 2.5 | 96.7 | (0.5–1.2) - <0.7 | 99+ |
| Total Coliforms N/100 ml | ($2\times10^7$–$2\times10^8$)-$5\times10^7$ | — | — | — | — | ~15,000 | 99.97 |

*Total N is ammonia N + nitrate N.

TABLE II

Concentration of Contaminants During Treatment
Sludge Age - 16 to 60 days

| Contaminant | Screen Sewage Range | Av. | Clarifier Effluent Range | Av. | Av.% Rem. | Filter Effluent Range | Av. | Remove Av.% |
|---|---|---|---|---|---|---|---|---|
| TOC | 35 – 111 | 68.6 | 6 – 20 | 10.9 | 84.1 | 1.4 – 5.4 | 3.6 | 95 |
| DOC | 15 – 46.5 | 29.0 | 5.4 – 8.8 | 6.7 | 76.8 | 0.7 – 4.4 | 1.7 | 94 |
| BOD | 55 – 297 | 177.5 | — | — | — | <1.0 – 5.3 | 2.6 | 98.5 |
| Ammonia -N | 8.9 – 54.5 | 24.9 | <0.4 – 1.9 | <0.4 | 98 | <0.4 – 0.7 | <0.4 | >98.5 |
| $NO_3$-N | 0.9 – 2.8 | 1.84 | 1.2 – 11.2 | 5.2 | — | 2.3 – 9.4 | 5.2 | — |
| Organic N | 6.3 – 9.1 | 7.6 | 0.7 – 1.5 | 1.1 | 85.5 | 0 – 0.1 | <0.1 | 99 |
| TN* | 16.8 – 63.9 | 35.1 | 1.6 – 11.6 | 6.4 | 82.0 | 2.7 – 9.8 | 5.3 | 85 |
| S.S. | 46 – 195 | 115 | 3.0 – 12.2 | 6.4 | 94.4 | 0 – 3.4 | 1.3 | 99 |
| V.S.S. | 46 – 167 | 94 | 2.6 – 7.6 | 5.1 | 94.5 | 0 – 3.3 | 0.9 | 99 |
| Turbidity | 45 – 125 | 74 | 1.6 – 4.2 | 2.68 | 96.3 | 0.5 – 1.2 | 0.7 | 99 |
| Total Dis. Sol. | 428 – 573 | 504 | 422 – 506 | 472 | 6.3 | 366 – 495 | 454 | 10 |

*TN = Total nitrogen = ammonia -N + nitrate -N + organic -N

The quantity of dissolved oxygen fed to the reactor 10 was about 8 mg/l. while the quantity leaving the reactor was less than 1 mg/l. For the clarifier 28, the quantity of dissolved oxygen fed was about 3 to 8 mg/l while the quantity in the effluent was about 1 to 4 mg/l.

The sludge from the reactor 10 and the clarifier 28 was passed by lines 42, 46 and 48 to the aeration tower Based on the above experimental results, a comparison was made of the process of this invention and that of the three-stage biological system discussed above and disclosed in Barth et al., JWPCF vol. 40, No. 12, p.2040 (1968), with regard to certain important parameters. This comparison is reproduced in the following Table III:

TABLE III

| PERFORMANCE DATA | PROCESS OF INVENTION | | THREE STAGE BIOLOGICAL SYSTEM | |
|---|---|---|---|---|
| Total Retention Time (hours) (Reactor, Clarifier, Aerator) | 5.9 – 7.13 | | 15 | |
| Organic Loading (lb BOD-day 1000 cu.ft. at reactors) | ~104 | | ~20 | |
| Sludge Production (lb VSS/lb BOD removed) | 0 | | >0.5 | |
| Effluent Quality (filtered) | | % Removed | | % Removed |
| TOC mg/l | 3.6 | 95.0 | 17.2* | 88.1 |
| COD mg/l | 7.9 | 95.0 | 38 | 88.1 |
| Total N+ | <5.3 | 85.0 | <1.7 | 86.0 |
| $NH_3$-N mg/l | <0.4 | 98.5 | 0.4 | 96.4 |

TABLE III-continued

| PERFORMANCE DATA | PROCESS OF INVENTION | | THREE STAGE BIOLOGICAL SYSTEM | |
|---|---|---|---|---|
| Suspended solids | <1.2 | 99+ | 1.7 | 98.9 |

*Calculated from COD/TOC = 2.2
+Total N = ammonia-N + nitrate-N + organic-N

Additionally, the present invention does not require the addition of methyl alcohol or other chemical source of energy for the denitrification reaction. The advantages of the present invention over the prior art process are readily apparent from the above Table III.

EXAMPLE 2

Utilizing a structure in accordance with the embodiment of FIGS. 2 to 4, raw primary treated domestic sewage at a rate of 4,000 gallons per day was treated over a continuous period of 38 days. The apparatus was unattended with the exception of the removal of samples of effluent in line 163 for analysis.

The constitution of the sewage varied widely over the test period as did the operating conditions. The variations in these parameters together with the average removal efficiencies for various contaminants appear in the following Tables IV, V and VI, respectively:

TABLE IV

| Concentrations of Contaminants in Sewage | | |
|---|---|---|
| | Raw Sewage | |
| Contaminant | Range | Average |
| Suspended solids mg/l (S.S.) | 63 to 199 | 122 |
| $BOD_5$ mg/l | 77 to 217 | 124 |
| Total organic carbon (TOC) mg/l | 61 to 124 | 93 |
| Soluble organic carbon (SOC) mg/l | 27 to 53 | 37 |
| $PO_4$ mg/l | 14 to 29 | 20 |
| Ammoniacal nitrogen mg/l ($NH_3$-N) | 12 to 35 | 20 |
| Total nitrogen mg/l (TKN) | 18 to 35 | 28 |
| Nitrite and nitrate nitrogen mg/l ($NO_3$-N) | 0.2 to 4.3 | 2.5 |
| Total dissolved solids mg/l (TDS) | 470 to 590 | 503 |
| Turbidity JTU | 54 to 125 | 75 |
| Coliform N/100 ml | ~4 × 10⁷ | 10⁷ |

TABLE V

| Operating Conditions | Range | Average |
|---|---|---|
| Feed rate (GPM) | 1.3 to 3.4 | 2.2 |
| MLSS (g/l) including activated carbon | 3.2 to 5.4 | 4.8 |
| MLVSS (including activated carbon) | 2.9 to 4.5 | 3.9 |
| SVI | 181 to 239 | 209 |
| Returned sludge:feed ratio | 3.7 to 4.9 | 4.2 |
| Detention time in reactor (hrs.) | 4.3 to 11.0 | 6.7 |
| Clarifier overflow (gal/sq.ft.min) | 0.17 to 0.34 | 0.23 |
| Air SCF/lb T.BOD Day | — | 1200 |
| Carbon $BOD_5$ removed (mg/l) | 70 to 133 | 100 |
| $NH_3$-BOD removed (mg/l) | 61 to 104 | 85 |
| Total BOD removed (mg/l) | — | 185 |
| Phosphorus removed $PO_4$(mg/l) | — | 4 |
| lb.T BOD/lb MLSS Day removed | — | 0.14 |
| lb.T BOD/1000 cu.ft. Day removed | — | 40.6 |

TABLE VI

| | Primary clarified Effluent (line 114) | | Clarifier Effluent (Line 163) | | |
|---|---|---|---|---|---|
| Contaminant | Range | Average | Range | Average | Average Efficiency % |
| S.S mg/l | 16 to 132 | 61 | 2 to 18 | 9.2 | 85 |
| $BOD_5$ | 30 to 202 | 109 | 5 to 19 | 9.6 | 91 |
| TOC | 43 to 142 | 71 | 6 to 11 | 8 | 88.7 |
| SOC | 18 to 55 | 33 | 5 to 8.5 | 6.4 | 80.6 |
| $PO_4$ | 14 to 28 | 19 | 10 to 24 | 15 | 21 |
| $NH_3$-N | 16 to 28 | 22 | <0.4 | <0.4 | >98 |
| TKN | 19 to 32 | 27 | 0.4 to 5.7 | 2.0 | 92.5 |
| $NO_3$-N | 0.2 to 4.4 | 3.3 | 3.0 to 8.7 | 6.3 | — |
| TDS | 450 to 600 | 495 | 450 to 600 | 516 | +2 |
| Turbidity JTU | 35 to 74 | 49 | 0.6 to 6.5 | 1.9 | 96 |
| Coli. n/100 ml | ~10⁷ | 10⁷ | ~10⁵ | 10⁵ | — |

SUMMARY

It will be seen, therefore, that the process of the present invention is able to remove substantially completely biodegradable carbonaceous, nitrogenous and suspended solids contaminants from waste water containing such contaminants while avoiding the production of substantial quantities of excess biological sludge, the necessity for external reactivation of carbon and the use of chemicals for clarification. In addition, the process of the present invention may be practised in equipment requiring little space and essentially no maintenance. Capital and operating costs, therefore, are significantly lower than with any other known waste treatment.

Modifications are possible within the scope of the present invention.

What I claim is:

1. A process for the treatment of waste water containing biodegradable carbonaceous materials and nitrogenous materials mainly in non-nitrite and non-nitrate form in a single upright reaction tank, which comprises:

separating the reaction tank into a first vertically extending zone extending the height of the reaction tank and a second vertically extending zone extending through the reaction tank to a location adjacent to and vertically spaced from the lower end of the tank and in fluid flow communication with said first zone at the lower end thereof only, establishing a liquid level in each of said zones and a flow path of liquid through said reaction zone downwardly through said first zone and upwardly through said second zone, mixing said waste water with recycled activated sludge in admixture with activated carbon and having sufficient molecular oxygen absorbed therein to oxidize substantially completely all the biodegradable carbonaceous material of said waste water, introducing the mixture formed thereby to said flow path at the upper liquid level in said first zone, flowing said mixture along said flow path downwardly through said first zone, controlling the rate of flow of said mixture through said first zone to carry out during said passage of said mixture downwardly through said first zone the reactions of:

i. simultaneously (a) biologically oxidizing part of said biodegradable carbonaceous material to carbon dioxide by adsorbing said part of said biodegradable carbonaceous material on said activated sludge and oxidizing said adsorbed material using part of said oxygen absorbed in said activated sludge and (b) biologically oxidizing non-nitrite and/or non-nitrate nitrogenous material to nitrite and/or nitrate form using part of said oxygen absorbed in said activated sludge, said biooxidations substantially depleting said oxygen absorbed in said activated sludge, whereby said biological oxidation of said non-nitrite and/or non-nitrate nitrogenous material results in residual unoxidized biodegradable carbonaceous material, and ii. after said depletion of said oxygen absorbed in said activated sludge biologically reducing to nitrogenous gases nitrate and/or nitrite nitrogenous material under the resulting anaerobic conditions while simultaneously oxidizing substantially all said residual unoxidized biodegradable carbonaceous material to carbon dioxide by adsorption thereof on said activated sludge and using chemically-bound oxygen in said nitrate and/or nitrite nitrogenous material, whereby said oxygen used in said biological oxidation of said non-nitrite and/or non-nitrate nitrogenous material is used during said anaerobic biological reduction to oxidize substantially all the residual unoxidized biodegradable carbonaceous material, said reactions of biological oxidation and biological reduction occuring simultaneously in said first zone with aerobic reactions predominating in the upper levels of liquid in said first zone and anaerobic reactions predominating in the lower levels of liquid in said first zone, allowing said carbon dioxide and nitrogenous gases to rise through said first zone countercurrently to said liquid flow, separating said carbon dioxide and nitrogenous materials from the upper level of the liquid phase in said first zone, settling activated sludge having a depleted oxygen content resulting from said reactions in said first zone in the bottom of said reaction tank, flowing liquor purified by said reactions in said first zone and having a depleted biodegradable carbonaceous materials-and nitrogenous materials-content in said flow path from said first zone and into and upwardly through said second zone, whereby said purified liquor and activated sludge having a depleted oxygen content are substantially completely separated and said settled activated sludge accumulates in the bottom of said reaction tank, withdrawing said purified liquor from said reaction tank at the downstream end of said flow path, removing settled activated sludge from the accumulation thereof substantially at a rate equivalent to the rate of mixing of activated sludge with said waste water, contacting said removed activated sludge with oxygen to reactivate the same and absorb sufficient oxygen therein to oxidize substantially all the biodegradable carbonaceous material of said waste water, and recycling said reactivated sludge to said mixing step to constitute said recycled activated sludge.

2. The process of claim 1 including providing conduit means in said reaction tank extending between the bottom of said reaction tank and said first zone through said second zone thereby establishing a second flow path, passing a gas consisting at least in part of molecular oxygen into said second flow path adjacent said accumulation of settled sludge, drawing sludge from said accumulation into said second flow path, conveying said drawn activated sludge to said first zone along said second flow path, causing said reactivation of said sludge and absorbtion of oxygen into said conveyed activated sludge in said second flow path, and discharging the resulting reactivated sludge containing absorbed oxygen from said second flow path into said first zone as said recycled activated sludge.

3. The process of claim 2 wherein said reaction tank is cylindrical, said first and second zones are defined and separated by a first cylindrical sleeve extending axially of said tank and said conduit means is defined in part by a second cylindrical sleeve extending axially of said tank inside said first cylindrical sleeve, and including providing said mixture of waste water and recycled activated sludge in said first zone as a rotating mass having a plug flow pattern through said first zone and accumulating the activated sludge together with any suspended solids in said waste water along the inner wall of said reaction tank.

4. The process of claim 3 wherein said rotation of said mass in said first zone is caused by discharging said recycled activated sludge containing absorbed oxygen from said second flow path tangentially to said reaction tank adjacent the liquid level in said first zone.

5. The process of claim 2 wherein said activated carbon includes granular activated carbon to abrade suspended solids in said second flow path.

6. The process of claim 1 wherein said purified liquor contains suspended activated sludge and including passing said purified liquor containing activated sludge to an upright cylindrical clarifier tank physically separate from but fluidly interconnected with said reaction tank, separating said suspended activated sludge from said purified liquor recovering clarified liquor from said clarifier tank and recycling said separated activated sludge to said reaction tank.

7. The process of claim 6, including separating said clarifier tank into a first vertically extending zone and a second vertically extending zone in fluid flow communication with said first zone at the lower end thereof only, establishing a liquid level in each of said zones and a flow path of liquid through said clarifier tank downwardly through said first zone and upwardly through said second zone, and wherein said separation operation is carried out by passing said purified liquor having residual entrained activated sludge therein downwardly through said first zone from the upstream end of said flow path through said clarifier tank, settling said residual activated sludge from said purified liquor in the bottom of the clarifier tank, conveying said clarified water upwardly through said second zone, and removing said clarified water from an upper level of said second zone at the downstream end of said flow path.

8. The process of claim 7 including providing conduit means extending between said settled activated sludge in said clarifier tank and said first zone of said reaction tank through said second zone thereof to establish a second flow path, passing a gas consisting at least in part of molecular oxygen into said second flow path adjacent said settled sludge in said clarifier tank, drawing activated sludge from said settled sludge into said second flow path, conveying said drawn activated sludge to said first zone of said reaction tank along said second flow path, absorbing oxygen into said conveyed activated sludge in said second flow path, and discharging activated sludge containing absorbed oxygen from said second flow path into said first zone of said reaction tank.

9. The process of claim 8 wherein said clarifier tank is cylindrical and said first and second zones are defined and separated by an inverted funnel-like member coaxially arranged with said tank, and including providing said purified liquor in said first zone of said clarifier tank as a rotating mass moving downwardly through said first zone, accumulating activated sludge together with suspended solids along the inner wall of said clarifier tank, accumulating entrained gases towards the axis of the clarifier tank and dissipating said accumulated entrained gases as a mild foam head on the surface of water in said first zone of said clarifier tank.

10. The process of claim 1 wherein said clarified water is subjected to at least one additional purification operation after removal from said clarifier tank, said at least one additional purification step being selected from the group consisting of coagulation, filtration, disinfection, reverse osmosis, evaporation and ion-exchange.

11. The process of claim 1 wherein said oxygen is absorbed in said activated sludge using a flow of an oxygen-containing gas of about 1200 SCF per lb. of average daily BOD to provide a concentration of oxygen in the waste water at the top of the first zone of about 8 mg/l. which decreases through the height of said first zone to about 1 mg/l. at the bottom thereof.

* * * * *